United States Patent
Thompson

(10) Patent No.: US 10,288,182 B2
(45) Date of Patent: May 14, 2019

(54) LOW LEAKAGE RELIEF VALVE

(71) Applicant: Parker-Hannifin Corporation, Cleveland, OH (US)

(72) Inventor: Jesse Thompson, Shepherdsville, KY (US)

(73) Assignee: Parker-Hannifin Corporation, Cleveland, OH (US)

(*) Notice: Subject to any disclaimer, the term of this patent is extended or adjusted under 35 U.S.C. 154(b) by 296 days.

(21) Appl. No.: 15/158,917

(22) Filed: May 19, 2016

(65) Prior Publication Data

US 2016/0363229 A1    Dec. 15, 2016

Related U.S. Application Data

(60) Provisional application No. 62/173,586, filed on Jun. 10, 2015.

(51) Int. Cl.
   *F16K 17/04*   (2006.01)
   *F16K 17/06*   (2006.01)

(52) U.S. Cl.
   CPC ............ *F16K 17/048* (2013.01); *F16K 17/06* (2013.01)

(58) Field of Classification Search
   CPC .. F16K 17/048; F16K 17/06; Y10T 137/7764; Y10T 137/7768
   See application file for complete search history.

(56) References Cited

U.S. PATENT DOCUMENTS

| | | | |
|---|---|---|---|
| 2,587,212 A * | 2/1952 | Placette | F16K 17/105 137/489.5 |
| 2,759,488 A | 8/1956 | Garrett et al. | |
| 3,164,166 A | 1/1965 | Tennis | |
| 3,294,111 A * | 12/1966 | Abercrombie | F16K 17/105 137/102 |
| 4,172,466 A * | 10/1979 | Pattarini | F16K 31/383 137/488 |
| 4,425,938 A * | 1/1984 | Papa | F16K 17/105 137/489 |
| 4,503,887 A * | 3/1985 | Johnson | F16K 31/402 137/601.13 |
| 4,615,354 A * | 10/1986 | Bianchi | F16K 39/024 137/110 |
| 4,679,765 A | 7/1987 | Kramer et al. | |
| 5,417,402 A * | 5/1995 | Speybroeck | G05D 16/2093 251/30.01 |
| 5,725,015 A * | 3/1998 | Theodos | G05D 16/166 137/488 |
| 5,890,508 A * | 4/1999 | Powell | F16K 17/105 137/15.19 |

(Continued)

*Primary Examiner* — Marina A Tiet Jen
*Assistant Examiner* — Frederick D Soski
(74) *Attorney, Agent, or Firm* — McDonnell Boehnen Hulbert & Berghoff LLP

(57) ABSTRACT

Provided is a relief valve with an inlet, and outlet, and a backside of a poppet fluidly connected to an input pressure to increasingly close the poppet as a function of input pressure until a prescribed pressure condition is reached. Upon the prescribed pressure condition being reached, the relief valve decreases pressure on the backside of the poppet to open the poppet and allow fluid flow from the inlet to the outlet. Increasingly closing the poppet allows the relief valve to operate under high pressure conditions and repeatedly open and close to reliable seal without significant leakage after thousands of cycles.

17 Claims, 2 Drawing Sheets

(56) References Cited

U.S. PATENT DOCUMENTS

| | | | | |
|---|---|---|---|---|
| 5,950,657 A * | 9/1999 | Lai | ................ | G05D 16/166 |
| | | | | 137/102 |
| 6,161,571 A * | 12/2000 | Taylor | ................ | G05D 16/16 |
| | | | | 137/488 |
| 6,220,280 B1 * | 4/2001 | Lai | ................ | F16K 31/363 |
| | | | | 137/488 |
| 9,109,716 B2 * | 8/2015 | Arai | ................ | F25B 41/062 |
| 2009/0272540 A1 * | 11/2009 | Rodgers | ................ | E21B 15/003 |
| | | | | 166/377 |
| 2012/0241024 A1 * | 9/2012 | Arai | ................ | F16K 31/406 |
| | | | | 137/487.5 |

\* cited by examiner

US 10,288,182 B2

LOW LEAKAGE RELIEF VALVE

RELATED APPLICATIONS

This application claims the benefit of U.S. Provisional Application No. 62/173,586 filed on Jun. 10, 2015, which is incorporated herein by reference.

FIELD OF INVENTION

The present invention relates generally to relief valves, and more particularly to relief valves for blow-out preventers.

BACKGROUND

In order to protect hydraulic devices connected at a work port, typically a pressure relief valve is placed in parallel with the workport. The pressure relief valve typically partially or totally exhausts to tank flow going to the workport during pressure limitation. Relief valves are used in some oil and gas applications to prevent leakage of subsurface fluids.

Leakage of subsurface fluids may pose an environmental threat if released from the wellbore. Equipment, such as blow out preventers, may be positioned about the wellbore to form a seal about a tubular therein to prevent leakage of fluid as it is brought to the surface. Blow out preventers may have selectively actuatable rams or ram bonnets, such as pipe rams or shear rams that may be activated to seal and/or sever a tubular in a wellbore.

SUMMARY OF INVENTION

The present invention provides a relief valve with an inlet, and outlet, and a backside of a poppet fluidly connected to an input pressure to increasingly close the poppet as a function of input pressure until a prescribed pressure condition is reached. Upon the prescribed pressure condition being reached, the relief valve decreases pressure on the backside of the poppet to open the poppet and allow fluid flow from the inlet to the outlet. Increasingly closing the poppet allows the relief valve to operate under high pressure conditions and repeatedly open and close to reliable seal without significant leakage after thousands of cycles.

According to one aspect of the invention, a relief valve assembly including a valve body having an inlet, an outlet and a valve seat, a poppet having a piston portion and a valve portion for engaging at a front side of the valve portion the valve seat to block flow from the inlet to the outlet, the poppet being movable in the valve body and defining at a backside of the piston portion a biasing chamber, a pressure line configured to provide an input pressure to the biasing chamber to provide the input pressure to the backside of the poppet, whereby in a first state increasing the input pressure increases a force of the poppet against the valve seat to reduce leakage between the valve seat and the poppet, an evacuation line for fluidly connecting the biasing chamber to a drain port, and an unloading valve in the evacuation line for blocking fluid flow from the biasing chamber to the drain port, until pressure in the inlet exceeds a first pressure setting which causes the unloading valve to open to allow fluid flow through the evacuation line from the biasing chamber to the drain port, whereby in a second state pressure of the fluid on the backside of the poppet is reduced below a predetermined proportion of a pressure at the inlet while the front side of the valve portion is exposed to the inlet pressure to allow the poppet to move away from the valve seat thereby allowing fluid to flow between the valve seat and the poppet from the inlet to the outlet.

The pressure line may be an inlet pressure line that fluidly connects the biasing chamber to the inlet for providing pressure from the inlet to the backside of the poppet, whereby in the first state increasing pressure of fluid at the inlet increases the force of the poppet against the valve seat to reduce leakage between the valve seat and the poppet.

The relief valve assembly may further include a resilient member biasing the poppet toward a closed position.

The relief valve assembly may further include a first signal line fluidly connecting the inlet to the unloading valve.

The first signal line may fluidly connect the inlet pressure line to the unloading valve.

The pressure line may fluidly connect the biasing chamber to a hydraulic circuit for providing pressure from the hydraulic circuit to the backside of the poppet, whereby in the first state increasing pressure of fluid from the hydraulic circuit increases the force of the poppet against the valve seat to reduce leakage between the valve seat and the poppet.

The relief valve assembly may further include an adjustable stroke limiter longitudinally spaced from the poppet and operably connected to the piston for adjustably limiting a stroke length of the piston.

The valve portion may face longitudinally away from the biasing chamber.

The drain port may be fluidly connected to the outlet downstream of the valve seat.

In a closed position the backside of the piston portion may have a cross-sectional area greater than a cross-sectional area, of a first portion of the front side of the valve portion exposed to the inlet pressure, by a cross-sectional area of the valve seat isolating a second portion of the front side from the inlet pressure.

The relief valve assembly may further include an orifice in the inlet pressure line.

The orifice may be downstream of a first signal line.

The orifice may be configured to reduce fluid flow from the inlet into the biasing chamber below a maximum flow rate of the unloading valve.

The unloading valve may include a signal port fluidly connected to a first signal line fluidly connected to the inlet pressure line and configured to open at a predetermined pressure, thereby allowing fluid from the biasing chamber to pass through the relief valve to a drain line.

The unloading valve may include an inlet port and a tank port fluidly connected to the evacuation line, whereby fluid from the biasing chamber flows into the inlet port and out of the tank port when the unloading valve is open.

The relief valve assembly may further include an evacuation signal line fluidly connected to an evacuation signal port of the unloading valve for signaling the unloading valve to open above a prescribed pressure.

The valve body may be remote from an unloading valve body of the unloading valve.

The unloading valve body may be mounted near a critical component of a hydraulic circuit.

The unloading valve may be operated by a remote pressure signal from a critical component of a hydraulic circuit.

According to another aspect of the invention, a method of relieving pressure in a hydraulic circuit providing pressure from an inlet at a backside of a poppet for urging the poppet against a valve seat with a closing force proportionally related to the inlet pressure for urging the poppet closed with increasing force as the inlet pressure increases, providing the inlet pressure at a front side of the poppet for urging the poppet away from the valve seat with an opening force proportionally related to the inlet pressure, and upon the inlet pressure exceeding a prescribed amount, evacuating pressure at the backside of the poppet for allowing the inlet pressure to force the poppet open, thereby allowing fluid flow between the poppet and the valve seat from the inlet to an outlet.

The method of relieving pressure may further include applying inlet pressure to a surface area of the backside of the poppet that is larger than a surface area of the front side of the poppet receiving the inlet pressure in a first state.

The method of relieving pressure may further include applying a biasing force from a resilient member urging the poppet closed in combination with the inlet pressure at the backside.

The method of relieving pressure may further include re-pressurizing the backside of the poppet with inlet pressure.

The method of relieving pressure may further include closing the poppet using the inlet pressure, thereby preventing fluid flow from the inlet to the outlet.

The method of relieving pressure may further include providing inlet pressure to an inner portion of the poppet, thereby expanding at least a portion of the valve portion of the poppet to decrease sealing imperfections against the valve seat.

The hydraulic circuit may include a blow off preventer fluidly connected to the inlet.

The inlet pressure may be provided remotely from a critical component in the hydraulic circuit.

The unloading signal may be provided remotely from the inlet pressure.

According to yet another aspect of the invention, a relief valve including a valve body having an inlet, an outlet, a valve seat, an inlet pressure port, and an evacuation port, a poppet having a piston portion and a valve portion for engaging at a front side of the valve portion the valve seat to block flow from the inlet to the outlet, the poppet being movable in the valve body and defining at a backside of the piston portion a biasing chamber, wherein the inlet pressure port is connectable to an inlet pressure line to fluidly connect the biasing chamber to the inlet for providing pressure from the inlet to the backside of the poppet, whereby in a first state increasing pressure of fluid at the inlet increases a force of the poppet against the valve seat to reduce leakage between the valve seat and the poppet, wherein the evacuation port is connectable to an evacuation line to fluidly connect the biasing chamber to a drain port, whereby when pressure in the inlet exceeds a first pressure setting, fluid flows through the evacuation port from the biasing chamber to the drain port, and whereby in a second state pressure of the fluid on the backside of the poppet is reduced below a predetermined proportion of the inlet pressure while the front side of the valve portion is exposed to the inlet pressure to allow the poppet to move away from the valve seat thereby allowing fluid to flow between the valve seat and the poppet from the inlet to the outlet.

According to a further aspect of the invention, a relief valve assembly including a valve body having an inlet, an outlet and a valve seat, a poppet having a piston portion and a valve portion for engaging at a front side of the valve portion the valve seat to block flow from the inlet to the outlet, the poppet being movable in the valve body and defining at a backside of the piston portion a biasing chamber, a pressure line fluidly connecting the biasing chamber to a hydraulic circuit for providing pressure from the hydraulic circuit to the backside of the poppet, whereby in a first state increasing pressure of fluid from the hydraulic circuit increases a force of the poppet against the valve seat to reduce leakage between the valve seat and the poppet, an evacuation line for fluidly connecting the biasing chamber to a drain port, and an unloading valve in the evacuation line for blocking fluid flow from the biasing chamber to the drain port, until pressure in the hydraulic circuit exceeds a first pressure setting which causes the unloading valve to open to allow fluid flow through the evacuation line from the biasing chamber to the drain port, whereby in a second state pressure of the fluid on the backside of the poppet is reduced below a predetermined proportion of pressure at the inlet while the front side of the valve portion is exposed to the inlet pressure to allow the poppet to move away from the valve seat thereby allowing fluid to flow between the valve seat and the poppet from the inlet to the outlet.

The foregoing and other features of the invention are hereinafter described in greater detail with reference to the accompanying drawings.

DETAILED DESCRIPTION

The principles of this present invention have particular application to high pressure hydraulic circuits and relieving pressure from the hydraulic circuits, such as from a blow off preventer connected to a drilling rig, and thus will be described below chiefly in this context. It will of course be appreciated, and also understood, that principles of this invention may be applicable to other hydraulic circuits where it is desirable to relieve excess pressure, such as from a hydraulic circuit in an aircraft.

Figure 1:
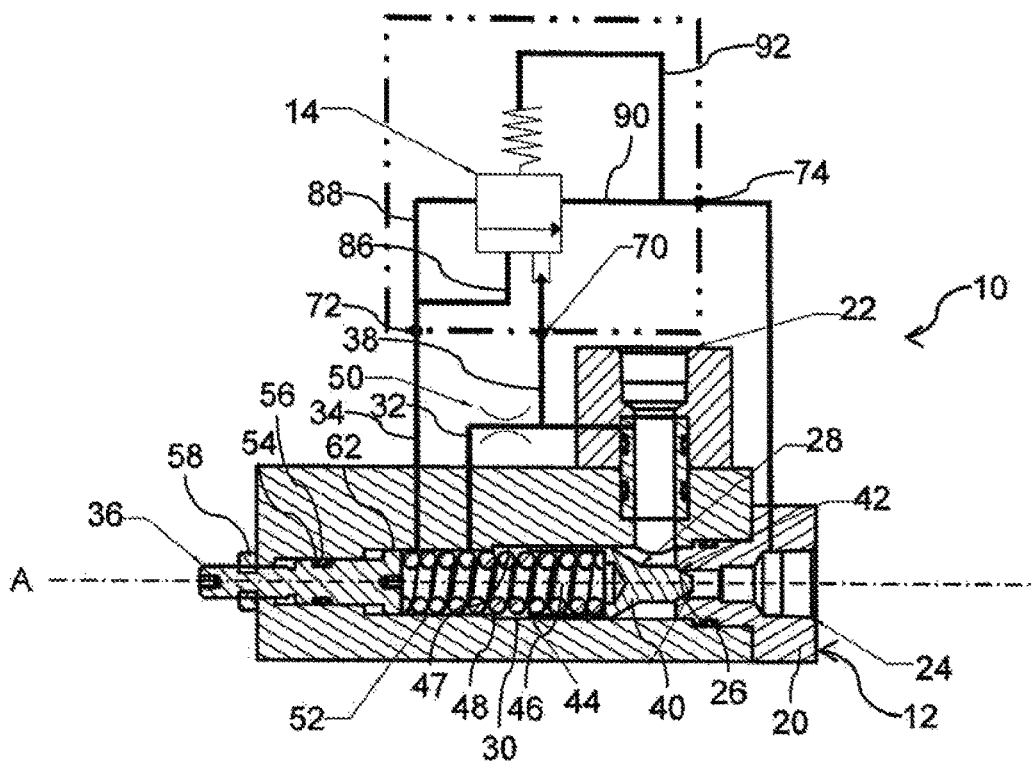
FIG. 1 is a schematic view of an exemplary relief valve assembly including a cross-sectional view of a relief valve connected to an unloading valve according to the invention.

Referring to the drawings, and initially to FIG. 1, an exemplary relief valve assembly is illustrated generally at reference numeral 10. The relief valve assembly 10 includes a relief valve 12 and an unloading valve 14 fluidly connected to the relief valve 12 to controllably open and close the relief valve 12 based on pressure provided to the relief valve 12. The relief valve 12 includes a valve body 20 having an inlet 22, an outlet 24 and a valve seat 26 between the inlet and outlet, a poppet 28 engageable with the valve seat 26, a biasing chamber 30 fluidly connected to an inlet pressure line 32 and an evacuation line 34, and an adjustable stroke limiter 36. The biasing chamber 30 is formed in the body 20 behind the poppet 28 between the poppet 28 and the stroke limiter 36.

The inlet 22 is fluidly connected to the outlet 24 when the poppet 28 is not engaged with the valve seat 26. Fluid having an inlet pressure enters the valve body 20 through the inlet 22 to pressurize a front side of the poppet exposed the inlet pressure. When the poppet 28 is in a closed position shown in FIG. 1 against the valve seat 26, the inlet pressure exerts an opening force that is less than a closing force exerted by the pressure from the inlet pressure line 32 and a biasing force from a spring acting on the backside of the poppet 28. When the poppet 28 is in an open position, the inlet pressure exerts an opening force that may be equal to or greater than a closing force exerted on the backside of the poppet 28 while the relief valve assembly 10 is in a state with the poppet 28 opening, maintaining an open position, or closing.

The poppet 28 is movable in the valve body 20 from the closed position to the open position to allow fluid to flow from the inlet 22 to the outlet 24. The poppet 28 includes a piston portion 40 and a valve portion 42 for engaging the valve seat 26 to block flow from the inlet 22 to the outlet 24 when the poppet 28 is in a closed position. The valve portion 42 extends from the piston portion 40 toward the valve seat 26 longitudinally away from the biasing chamber 30. For example, the poppet 28 may move in the valve body 20 along a longitudinal axis A of the relief valve 12. A backside of the piston portion 40 has a surface facing longitudinally in a first direction away from the valve portion 42 with an axially facing surface area greater than an area of a front side surface of the valve portion 42 facing axially in a second direction opposite the first direction when the poppet 28 is in the closed position.

The biasing chamber 30 is defined by an inner surface 47 of the valve body 20 behind the piston portion 40 within the valve body 20 and fluidly disconnected from the inlet 22 and outlet 24 by the poppet 28. The biasing chamber 30 is formed behind the backside of the piston portion 40 to allow fluid pressure in the biasing chamber 30 to exert a closing force on the poppet 28. The piston portion 40 includes a rearwardly extending portion 44 that defines a cavity 46 and allows fluid to flow from the inlet 22 between the rearwardly extending portion 44 and the inner surface 47 of the valve body 20. Allowing fluid flow allows the relief valve to weigh and/or cost less because neither an extra seal nor a tight machining tolerance between the rearwardly extending portion 44 is necessary to prevent fluid flow. The rearwardly extending portion 44 extends circumferentially near the inner surface 47 to limit fluid flow between the piston portion 40 and the inner surface 47. Limiting fluid transfer to the unloading valve 14 prevents overloading the unloading valve 14 with fluid from the inlet 22 and allows improved control of the poppet 28 when the poppet 28 is desired to be open. In an alternative embodiment, the poppet, for example the rearwardly extending portion, circumferentially abuts the inner surface of the valve body to prevent fluid from flowing between the piston portion and the inner surface.

The inner surface 47 includes a ledge 48 for engaging an end face of the rearwardly extending portion 44 to serve as a stop surface for the piston portion 40 and a maximum open position of the poppet 28. The ledge 48 is longitudinally spaced along the inner surface 47 from a connection between the inlet pressure line 32 and the surface 47 and spaced from a connection between the evacuation line 34 and the surface to allow fluid flow to and from the biasing chamber 30 without interference from the poppet 28 while opening or closing. For example, the ledge 48 allows the poppet to move longitudinally to the maximum open position without any portion of the poppet 28 overlapping any portion of the inlet pressure line 32 or the evacuation line 34.

When the poppet 28 is transitioning from the closed position to the open position the pressure at the backside of the piston portion 40 is reduced to allow the fluid from the biasing chamber 30 to drain through the evacuation line 34 fluidly connected the biasing chamber 30 to the outlet 24 through the unloading valve 14. For example, the signal line 38 may fluidly connect to the inlet pressure line 32 to simplify assembly and manufacturing of the relief valve assembly 10. The fluid connection between the signal line 38 and the inlet pressure line 32 may fluidly connect the signal line 38 directly to the inlet 22 without a flow or pressure limiter in between. In an embodiment, the evacuation line 34 is fluidly connected through the unloading valve 14 to a remote drain port (not shown) external of the valve body 20. In another embodiment, an evacuation signal port is not provided and fluid in the biasing chamber 30 is able to evacuate through the evacuation line 34 fluidly connected to the unloading valve 14. In still another embodiment, the signal line 38 fluidly connects to the inlet 22 remote from the inlet pressure line 32.

The inlet pressure line 32 fluidly connects the inlet 22 to the biasing chamber 30 to provide inlet pressure to the backside of the piston portion 40 to maintain the poppet 28 in the closed position. Due to the longitudinally facing area differences between the backside and front side of the valve portion 42 when closed, the closing force acting on the poppet 28 is greater than an opening force. When the poppet 28 is in the open position the inlet pressure may exceed the pressure at the backside of the piston portion 40 allowing the opening force acting on the valve portion 42 to overcome the closing force acting on the piston portion 40, thereby allowing fluid to flow from the inlet 22 to the outlet 24. An orifice 50 may be provided in the inlet pressure line 32 to improve stability of the relief valve 12 and to prevent chattering of the valve portion 42 against the valve seat 26. The orifice 50 reduces fluid flow from the inlet 22 to the biasing chamber 30, thereby delaying pressure equalization between the inlet 22 and the biasing chamber 30 and preventing rapid opening and closing of the poppet 28 when the unloading valve 14 is open.

When the relief valve assembly 10 is in a state of the unloading valve 14 being opened by a first pressure value in the signal line 38, fluid is evacuated from the biasing chamber 30 through the evacuation line 34 and fluid continues to enter through the inlet pressure line 32 to pressurize the backside of the piston portion 40. As the unloading valve 14 opens, the pressure on the backside of the piston portion 40 drops to below the inlet pressure to allow the poppet 28 to open. If the inlet pressure fluctuates and lowers to a value equal to or below the pressure at the backside of the piston portion 40, the poppet 28 will close due to less opening force being exerted on the poppet 28 as the inlet pressure drops. Closing the unloading valve 14 allows the pressure on the backside of the piston portion 40 to rise to the level of the inlet pressure and to close the poppet 28 in conjunction with a resilient member 52.

When the unloading valve 14 is open, the orifice 50 impedes flow between the inlet 22 and the biasing chamber 30, which prevents over saturation of the unloading valve 14 and enhances the stability of the poppet 28. When the unloading valve 14 is evacuating fluid from the biasing chamber 30, the rate of evacuation is limited by the maximum flow rate of the unloading valve 14. Flow above the maximum flow rate over saturates the unloading valve 14 and can cause fluid build up behind the poppet 28 causing the poppet 28 to close or preventing the poppet 28 from closing. The orifice 50 may reduce a fluid flow rate from the inlet 22 through the biasing chamber 30 and to the unloading valve 14 to a rate below the maximum flow rate of the unloading valve 14.

When fluid flows between the piston portion 40 and the inner surface 47, the orifice 50 may reduce the fluid flow rate to the unloading valve 14 to a rate below the maximum flow rate of the unloading valve 14. The orifice 50 may be an adjustable orifice to allow easy modulation of flow to the unloading valve 14. Modulating the flow with the orifice 50 allows control of the fluid flow to the unloading valve 14 through the biasing chamber 30 without adjusting the fluid flow between the rearwardly extending portion 44 and the inner surface 47. In an alternative embodiment, fluid does not flow between the poppet and the inner surface, allowing the orifice to control all fluid flowing to the unloading valve 14.

Reducing the flow rate with the orifice 50 below the maximum allows the poppet 28 to remain open while the pressure and flow rate at the inlet 22 rise indefinitely. Keeping the poppet 28 open prevents damage or wear to sensitive components connected to or near the relief valve assembly 10 and/or damage to the relief valve assembly 10 itself that otherwise might occur under high pressure conditions.

When the unloading valve 14 is open, the orifice 50 allows a pressure differential to form between the inlet 22 and the biasing chamber 30 to increase stability of the poppet 28. The pressure differential allows a reduction of the pressure within the biasing chamber 30 and fluid flow to the biasing chamber 30, thus reducing the closing force exerted on the poppet 28 and allowing the poppet 28 to freely open without extra impedance from the fluid behind the poppet 28.

While the unloading valve 14 is open and the poppet 28 is open, a pressure differential exists between the biasing chamber 30 and the inlet 22 to increase the opening force compared to the closing force on the poppet 28, thereby allowing the poppet 28 to more easily remain open. If the inlet pressure drops below the first pressure value, the unloading valve 14 closes and the pressure in the biasing chamber 30 begins to rise to the level of the inlet pressure. As the closing force from the pressure in the biasing chamber 30 approaches the opening force of the pressure in the inlet 22, the poppet 28 will approach a neutral state where opening force is equal to closing force. The resilient member 52 allows the poppet 28 to close when in or near the neutral state of the inlet pressure being about equal to or slightly greater than the pressure in the biasing chamber 30.

The closing force on the poppet 28 is a function of pressure in the biasing chamber 30, which is equal to or a function of the inlet pressure, and force from the resilient member 52. Closing the poppet 28 prevents the outlet 24 from receiving excess fluid when the inlet pressure is below the first pressure value of the unloading valve 14. The resilient member 52 may be a coil spring having one end seated on the piston portion 40 in the cavity 46 and another end seated on the adjustable stroke limiter 36. The resilient member provides a closing force to a longitudinally facing portion of the piston portion 40 to bias the poppet 28 in the closed position. In an embodiment, the resilient member 52 is configured to provide a closing force only when the poppet 28 is in the open position. In an alternative embodiment the resilient member is not included.

Referring now to the adjustable stroke limiter 36, the adjustable stroke limiter 36 adjusts the compression of the resilient member 52 and may adjust the opening position of the poppet 28 allowing flow control of the outlet 24. The adjustable stroke limiter 36 may be a piston including a radially outward groove 54 that receives a suitable seal 56, such as an o-ring, against the inner surface 47 to prevent fluid from escaping between the adjustable stroke limiter and the valve body 20. The piston may include a longitudinally facing surface for abutting the resilient member 52 within the biasing chamber. A nut 58, such as a jam nut, is threaded for engaging a radially outer surface of the adjustable stroke limiter 36. The nut 58 includes a longitudinally facing surface to abut the valve body 20 and allows securing the adjustable stroke limiter 36 into a position longitudinally spaced from the inlet pressure line 32 and the evacuation line 36, opposite the poppet 28. The adjustable stroke limiter 36 also includes a radially outwardly facing surface 62 abutting the inner surface 47. The inner surface 47 allows the adjustable stroke limiter 36 to remain aligned with the longitudinal axis A during assembly of the adjustable stroke limiter 36 through the biasing chamber 30 or during adjustment of the nut 58 to longitudinally move the radially outwardly facing surface 62.

As the adjustable stroke limiter 36 is adjusted longitudinally toward the poppet 28, the closing force of the resilient member 52 is increased. The opening stroke of the poppet 28 may be limited by requiring more inlet pressure to open the poppet 28 and/or by creating an interference with the resilient member 52 against itself during compression to stop the poppet 28 from retracting further. Increasing the compression of the resilient member 52 using the adjustable stroke limiter 36 biases the poppet 28 closed and allows inlet pressure to increase relative to the pressure in the biasing chamber 30 before the poppet 28 will open from the closed position or close from the open position.

Adjusting the stroke length of the poppet 28 using the adjustable stroke limiter 36 allows flow control of the outlet by adjusting a fully-open position of the poppet 28 to reduce or increase a maximum flow rate between the poppet 28 and the valve seat 26. Modifying the maximum flow rate to a value near or below the flow rate provided to the inlet 22 allows improvement of stability of the relief valve assembly 10 during use. For example, the maximum flow rate produced by a hydraulic circuit and provided to the inlet 22 may be 20 gallons per minute (GPM) and a maximum flow rate through the inlet 22 and between the poppet 28 and the valve seat 26 may be 10 GPM. As inlet pressure increases above the first pressure value to open the unloading valve 14 and the poppet 28, the inlet pressure quickly drops below the first pressure value causing the unloading valve 14 and the poppet 28 to close. Once the poppet 28 is closed the inlet pressure may build up again above the first pressure value to re-open the unloading valve 14 and poppet 28 again, which may cause chattering of the unloading valve 14 and the relief valve 12.

Adjusting the adjustable stroke limiter 36 to limit the fully-open position of the poppet 28 reduces the maximum flow rate between the poppet 28 and the valve seat 26. For example, adjusting the maximum flow rate to 20 GPM or lower than the 20 GPM hydraulic circuit allows the unloading valve 14 to remain open until pressure in the hydraulic circuit provided to the inlet 22 is below the first pressure value. Adjusting the maximum flow rate for the poppet 28 to remain open until the hydraulic circuit pressure lowers enough to cause the inlet pressure to drop below the first pressure value allows the relief valve 12 to relieve a pressure spike in the hydraulic circuit without the poppet 28 chattering or otherwise repeatedly opening and closing. In an embodiment the maximum flow rate produced by a hydraulic circuit and provided to the inlet 22 may be 50 gallons per minute (GPM) and a maximum flow rate through the inlet 22 and between the poppet 28 and the valve seat 26 may be 10 GPM.

Raising the inlet pressure above the first pressure value allows the unloading valve 14 to re-open and in turn re-open the poppet 28. Thus, after the inlet pressure falls below the first pressure value the relief valve assembly 10 enters a closing state with the unloading valve 14 closing and the poppet 28 closing, and after the inlet pressure rises above the first pressure value the relief valve assembly 10 enters an opening state with the unloading valve 14 opening and the poppet 28 opening. For example, the poppet 28 may open or close in response to the unloading valve 14 opening or closing, respectively.

The unloading valve 14 may be integrated with the relief valve 12. Integrating the unloading valve 14 and the relief valve 12 allows assembly cost savings by simplifying installation of the relief valve assembly 10 and allows material savings by using lines running shorter distances. Alternatively, the unloading valve 14 may be mounted remote from the relief valve 12. For example, the unloading valve 14 may be fluidly connected at or near a critical component in the hydraulic circuit to minimize pressure fluctuations over a distance and remotely fluidly connected to the biasing chamber 30 through the evacuation line 34. Mounting the unloading valve 14 near the critical component allows the unloading valve 14 to be responsive to pressure fluctuations to control the evacuation of the biasing chamber 30.

Figure 2:
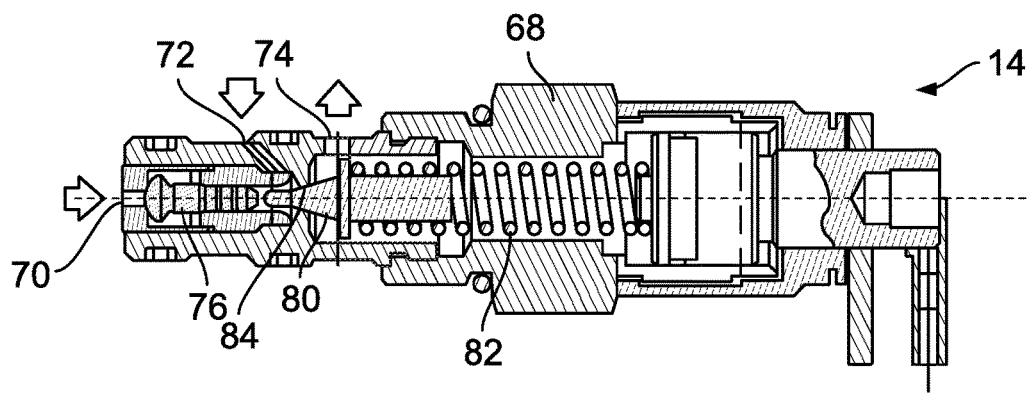
FIG. 2 is a cross-sectional view of the unloading valve.

Referring to FIG. 2, the unloading valve 14 may be any suitable relief valve. For example, the unloading valve 14 may be a differential area unloading relief valve, such as a series RU101 valve available from Parker-Hannifin Corporation of Cleveland, Ohio, USA, exemplified in FIG. 2. The unloading valve 14, which may be used as a pilot valve in a low flow accumulator unloading circuits, provides a fixed percentage between load and unload pressures. The unloading valve 14 includes an unloading valve body 68, an evacuation signal port 70, an inlet port 72, and a tank port 74.

The evacuation signal port 70 is formed in a portion of the valve body 68 and is fluidly connected to the signal line 38 (as shown in FIG. 1). The evacuation signal port 70 allows fluid from the inlet 22 to flow to the unloading valve 14 to indicate whether the unloading valve 14 should be open or closed. For example, the evacuation signal port 70 allows fluid to flow to a piston 76, which in turn exerts a force on a poppet 80 based on the pressure in the inlet 22 (FIG. 1) communicated through the evacuation signal port 70. The poppet 80 transfers force against a resilient member 82, for example a coil spring, that allows the poppet 80 to open by moving away from a valve seat 84 when the pressure communicated through the evacuation signal port 70 reaches a first pressure value. Opening the poppet 80 allows fluid from the inlet port 72 to flow through the unloading valve 14 and out of the tank port 74, which may be formed in a portion of the valve body 68.

The inlet port 72 is formed in a portion of the valve body 68 and is fluidly connected to the evacuation line 34 (FIG. 1). The inlet port 72 allows fluid from the biasing chamber 30 (FIG. 1) to flow through the unloading valve 14 when the valve 14 is open. Fluid entering the inlet port 72 exerts an opening force on the poppet 80 in conjunction with the force from the piston 76. The fluid from the inlet port 72 exerting an opening force is schematically represented by an evacuation pilot line 86 in FIG. 1. The fluid flow from the inlet port 72 through the unloading valve body 68 and out the tank port 74 is schematically represented by an evacuation flow line 88 in FIG. 1 and illustrated fluidly connected to the tank port 74 through drain line 90 when the unloading valve 14 is open, thereby allowing fluid to flow from the biasing chamber 30 through the evacuation line 34 to a tank, for example through the outlet 24.

In another embodiment, the evacuation pilot line is physically connected to the evacuation signal port 70 separate from the evacuation flow line, which is fluidly connected to the inlet port 72, while the signal line 38 is eliminated. Without the signal line 38 the evacuation line 34 signals the unloading valve 14 to open and evacuates fluid from the biasing chamber 30 when the pressure at the inlet 22 reaches the first pressure value and the unloading valve 14 opens. Using the evacuation line 34 to signal the unloading valve 14 instead of the signal line 38 allows assembly time savings by eliminating the signal line 38 and potential weight savings of the relief valve assembly 10. In still another embodiment, the evacuation line is connected to inlet port 72, while the signal line 38 is eliminated.

Referring again to FIGS. 1 and 2, a check line 92 schematically represents a fluid connection between the tank port 74 and the poppet 80 to operate the poppet 80 as a check valve in response to high pressure fluid from the outlet 24. During operation of the relief valve assembly 10 fluid exits the relief valve 12 through the outlet 24. At high pressures the fluid may cause fluid to flow in reverse from the outlet 24 to the tank port 74. The check line 92 allows the poppet 80 to close against the valve seat 84, thereby preventing fluid from flowing from the outlet 24 through unloading valve 14 to the biasing chamber 30.

Figure 3:
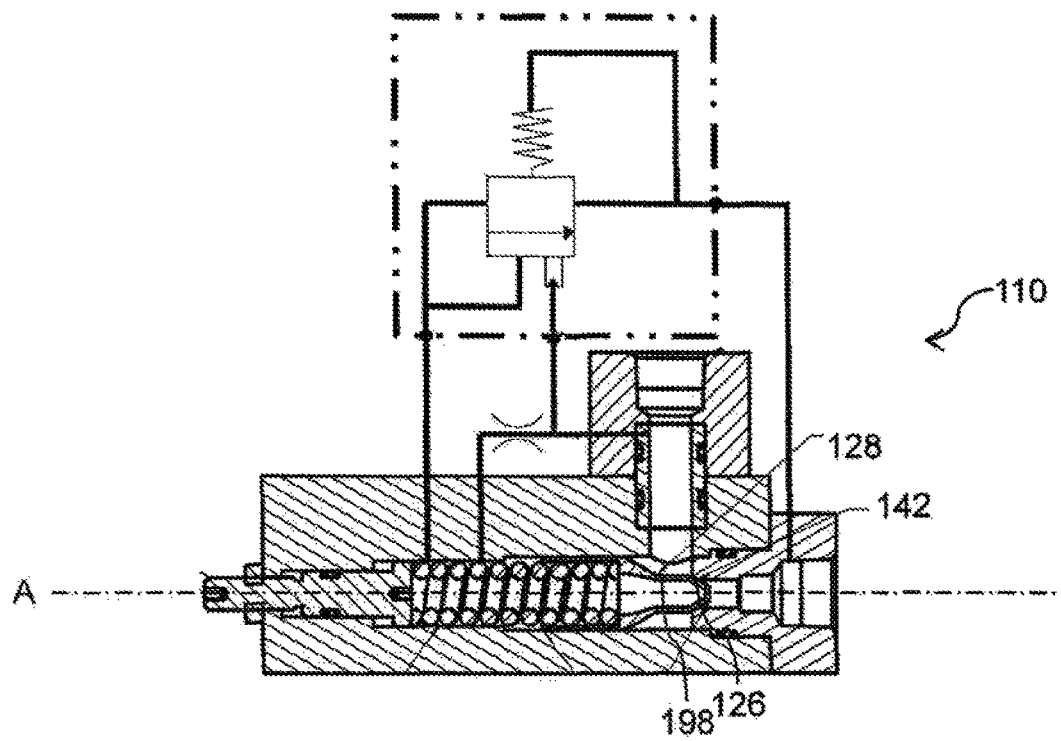
FIG. 3 is a schematic view of another exemplary relief valve assembly including a cross-sectional view of a relief valve with a hollow poppet according to the invention.

Turning now to FIG. 3, an exemplary embodiment of the relief valve assembly is shown at 110. The relief valve assembly 110 is substantially the same as the above-referenced relief valve assembly 10, and consequently the same reference numerals but indexed by 100 are used to denote structures corresponding to similar structures in the relief valve assembly 110. In addition, the foregoing description of the relief valve assembly 10 is equally applicable to the relief valve assembly 110 except as noted below. Moreover, it will be appreciated upon reading and understanding the specification that aspects of the relief valve assemblies may be substituted for one another or used in conjunction with one another where applicable.

The relief valve assembly 110 includes a poppet 128 that is hollow, i.e. defines a cavity 198. The cavity 198 is fluidly connected to the biasing chamber 30 so that fluid from the biasing chamber 30 flows into the cavity 198 to fill the cavity to force a valve portion 142 of the poppet 128 radially outward and into a valve seat 126. The force allows the valve portion 142 to expand against the valve seat 126 to decrease sealing imperfections against the valve seat 126. For example, the valve portion 142 may deform slightly to the shape of a corresponding portion of the valve seat 126, thereby removing gaps between the valve portion 142 and the valve seat 126.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A relief valve assembly including:
a valve body having an inlet, an outlet and a valve seat;
a poppet having a piston portion and a valve portion for engaging at a front side of the valve portion the valve seat to block flow from the inlet to the outlet, the poppet being movable in the valve body and defining at a backside of the piston portion a biasing chamber;
a resilient member having a first end seated at the piston portion of the poppet and a second end seated on an adjustable stroke limiter disposed in the valve body, wherein the resilient member applies a biasing force on the poppet toward the valve seat, and wherein the biasing force is adjustable by the adjustable stroke limiter;
a pressure line configured to provide an input pressure to the biasing chamber to provide the input pressure to the backside of the poppet, whereby in a first state increasing the input pressure increases a force of the poppet against the valve seat to reduce leakage between the valve seat and the poppet;
an evacuation line for fluidly connecting the biasing chamber to a drain port; and
an unloading valve in the evacuation line for blocking fluid flow from the biasing chamber to the drain port, until pressure in the inlet exceeds a first pressure setting which causes the unloading valve to open to allow fluid flow through the evacuation line from the biasing chamber to the drain port, whereby in a second state pressure of fluid on the backside of the poppet is reduced below a predetermined proportion of an inlet pressure at the inlet while the front side of the valve portion is exposed to the inlet pressure to allow the poppet to move away from the valve seat against the biasing force of the resilient member thereby allowing fluid to flow between the valve seat and the poppet from the inlet to the outlet.

2. The relief valve assembly of claim 1, wherein the pressure line fluidly connects the biasing chamber to fluid received at the inlet of the valve body for providing pressure of the fluid received at the inlet to the backside of the poppet, whereby in the first state increasing pressure of the fluid received at the inlet increases the force of the poppet against the valve seat to reduce leakage between the valve seat and the poppet.

3. The relief valve assembly of claim 1, wherein the valve portion faces longitudinally away from the biasing chamber.

4. The relief valve assembly of claim 1, wherein the drain port is fluidly connected to the outlet downstream of the valve seat.

5. The relief valve assembly of claim 1, wherein a portion of the biasing chamber is defined by a cavity within the piston portion of the poppet, and wherein the first end of the resilient member is received within the cavity of the piston portion.

6. The relief valve assembly of claim 1, wherein in a closed position the backside of the piston portion has a cross-sectional area greater than a cross-sectional area of a first portion of the front side of the valve portion exposed to the inlet pressure, by a cross-sectional area of the valve seat isolating a second portion of the front side from the inlet pressure.

7. The relief valve assembly of claim 1, wherein the unloading valve includes an inlet port and a tank port fluidly connected to the evacuation line, whereby fluid from the biasing chamber flows into the inlet port and out of the tank port when the unloading valve is open.

8. The relief valve assembly of claim 7, further including an evacuation signal line fluidly connected to an evacuation signal port of the unloading valve for signaling the unloading valve to open above a prescribed pressure.

9. The relief valve assembly of claim 1, wherein the pressure line is an inlet pressure line that fluidly connects the biasing chamber to the inlet for providing the inlet pressure to the backside of the poppet, whereby in the first state increasing pressure of fluid at the inlet increases the force of the poppet against the valve seat to reduce leakage between the valve seat and the poppet.

10. The relief valve assembly of claim 9, further including a first signal line fluidly connecting the inlet to the unloading valve.

11. The relief valve assembly of claim 9, wherein the unloading valve includes a signal port fluidly connected to a first signal line fluidly connected to the inlet pressure line and configured to open at a predetermined pressure, thereby allowing fluid from the biasing chamber to pass through the unloading valve to a drain line.

12. The relief valve assembly of claim 9, further including an orifice in the inlet pressure line, wherein the orifice is configured to reduce fluid flow from the inlet into the biasing chamber below a maximum flow rate of the unloading valve.

13. The relief valve assembly of claim 12, wherein the orifice is disposed external to the poppet and the valve body and is disposed downstream of a first signal line that fluidly connects the inlet pressure line to the unloading valve.

14. A method of relieving pressure in a hydraulic circuit:
providing inlet pressure from an inlet to a backside of a poppet for urging the poppet against a valve seat with a closing force proportionally related to the inlet pressure for urging the poppet closed with increasing force as the inlet pressure increases, wherein a resilient member having a first end seated at the backside of the poppet and a second end seated on an adjustable stroke limiter applies a biasing force on the poppet toward the valve seat, and wherein the biasing force is adjustable by the adjustable stroke limiter;
providing the inlet pressure at a front side of the poppet for urging the poppet away from the valve seat with an opening force proportionally related to the inlet pressure; and
upon the inlet pressure exceeding a prescribed amount, evacuating pressure at the backside of the poppet for allowing the inlet pressure to force the poppet open, thereby allowing fluid flow between the poppet and the valve seat from the inlet to an outlet.

15. The method of relieving pressure of claim 14, further including closing the poppet using the inlet pressure, thereby preventing fluid flow from the inlet to the outlet.

16. The method of relieving pressure of claim 14, wherein the poppet has a valve portion configured to engage the valve seat when the poppet is urged against the valve seat, wherein the poppet is hollow and defines a cavity therein, the method further including providing the inlet pressure to the cavity of the poppet, thereby expanding at least a portion of the valve portion of the poppet to decrease sealing imperfections against the valve seat.

17. A relief valve including:
a valve body having an inlet, an outlet, a valve seat, an inlet pressure port, and an evacuation port;
a poppet having a piston portion and a valve portion for engaging at a front side of the valve portion the valve seat to block flow from the inlet to the outlet, the poppet being movable in the valve body and defining at a backside of the piston portion a biasing chamber; and a resilient member having a first end seated at the piston portion of the poppet and a second end seated on an adjustable stroke limiter disposed in the valve body, wherein the resilient member applies a biasing force on the poppet toward the valve seat, and wherein the biasing force is adjustable by the adjustable stroke limiter, wherein the inlet pressure port is connectable to an inlet pressure line to fluidly connect the biasing chamber to the inlet for providing inlet pressure from the inlet to the backside of the piston portion, whereby in a first state increasing the inlet pressure increases a force of the poppet against the valve seat to reduce leakage between the valve seat and the poppet, wherein the evacuation port is connectable to an evacuation line to fluidly connect the biasing chamber to a drain port, whereby when pressure in the inlet exceeds a first pressure setting, fluid flows through the evacuation port from the biasing chamber to the drain port, and whereby in a second state pressure of the fluid on the backside of the piston portion is reduced below a predetermined proportion of the inlet pressure while the front side of the valve portion is exposed to the inlet pressure to allow the poppet to move away from the valve seat against the biasing force of the resilient member thereby allowing fluid to flow between the valve seat and the poppet from the inlet to the outlet.

* * * * *